United States Patent [19]

Klinger

[11] 4,134,053
[45] Jan. 9, 1979

[54] METHOD AND MEANS FOR CAPTURING MAGNETIC TRACKS

[75] Inventor: Lance T. Klinger, Playa Del Rey, Calif.

[73] Assignee: Xerox Corporation, Stamford, Conn.

[21] Appl. No.: 735,851

[22] Filed: Oct. 26, 1976

[51] Int. Cl.² ............................................. G05B 13/00
[52] U.S. Cl. ..................................... 318/561; 318/594; 360/75
[58] Field of Search ........................ 318/561, 594, 603; 360/75, 77, 78

[56] References Cited

U.S. PATENT DOCUMENTS

| 3,663,880 | 5/1972 | Gabor | 318/608 X |
| 3,812,533 | 5/1974 | Kimuba et al. | 360/77 |
| 3,864,740 | 2/1975 | Sordello et al. | 360/77 |
| 3,906,326 | 9/1975 | Chur | 318/576 X |
| 4,006,394 | 2/1977 | Cuda et al. | 318/603 X |
| 4,030,132 | 6/1977 | Iftikar et al. | 360/77 |
| 4,068,267 | 1/1978 | Inouye | 360/77 |

Primary Examiner—B. Dobeck
Attorney, Agent, or Firm—Barry Paul Smith

[57] ABSTRACT

In a disc drive which does not have a head position sensor but does have a velocity detector and off-track error detection means for sensing the distance and direction of the displacement of the head from the nearest track center, and in which the direction signal from the error detector is of one polarity for odd numbered tracks and of the opposite polarity for even numbered tracks, a system is provided for capturing a track on a blind seek which involves detecting deceleration of the head to below capture velocity, allowing the head to drift past the next track center while sensing whether that track is odd or even, and then initiating a capture of the next following track on the basis of whether the detected track is odd or even and the direction of seek.

2 Claims, 3 Drawing Figures

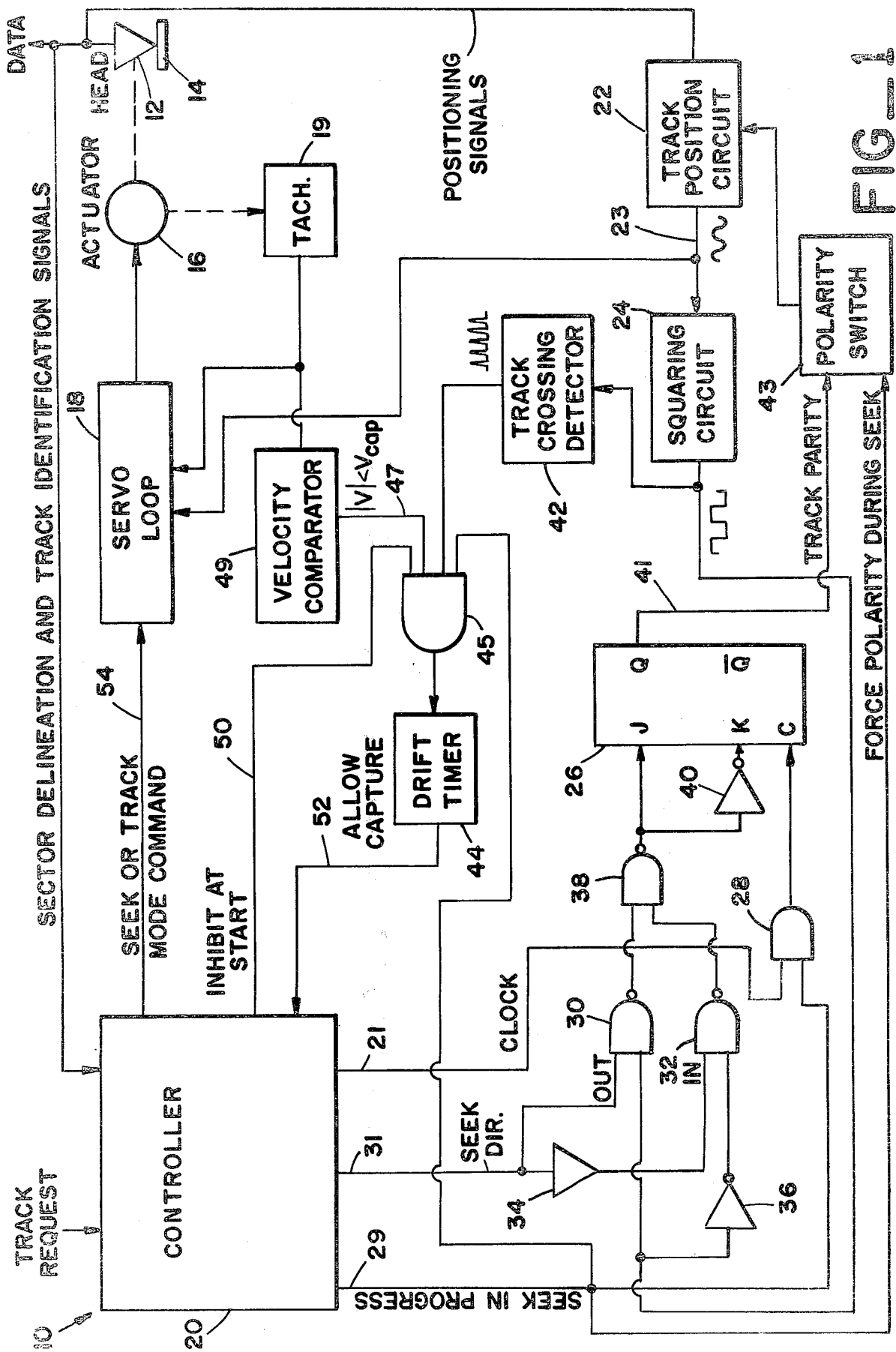
FIG_1

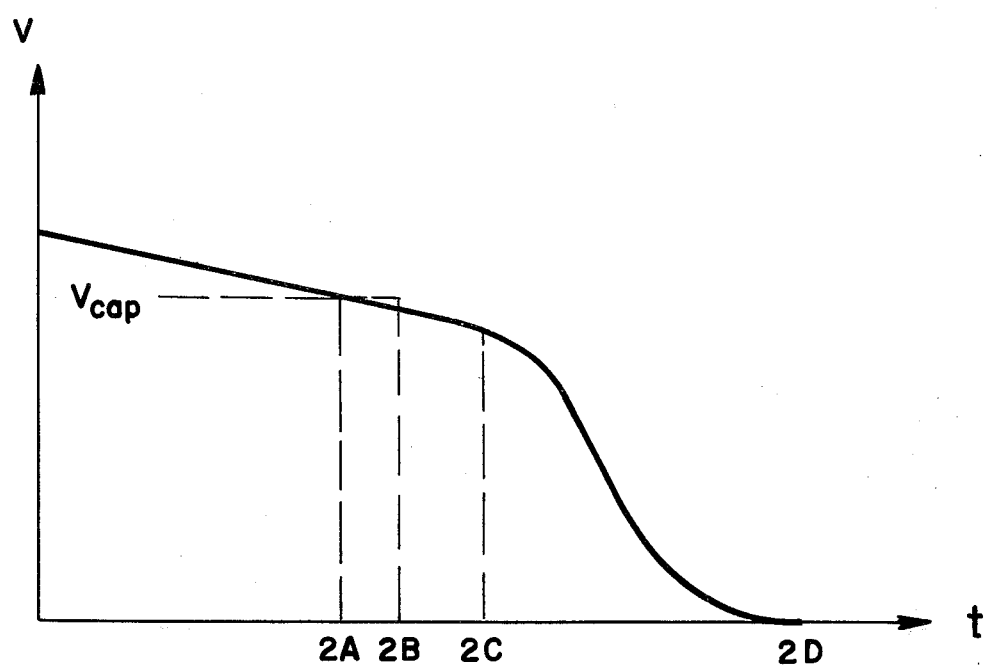
FIG_2

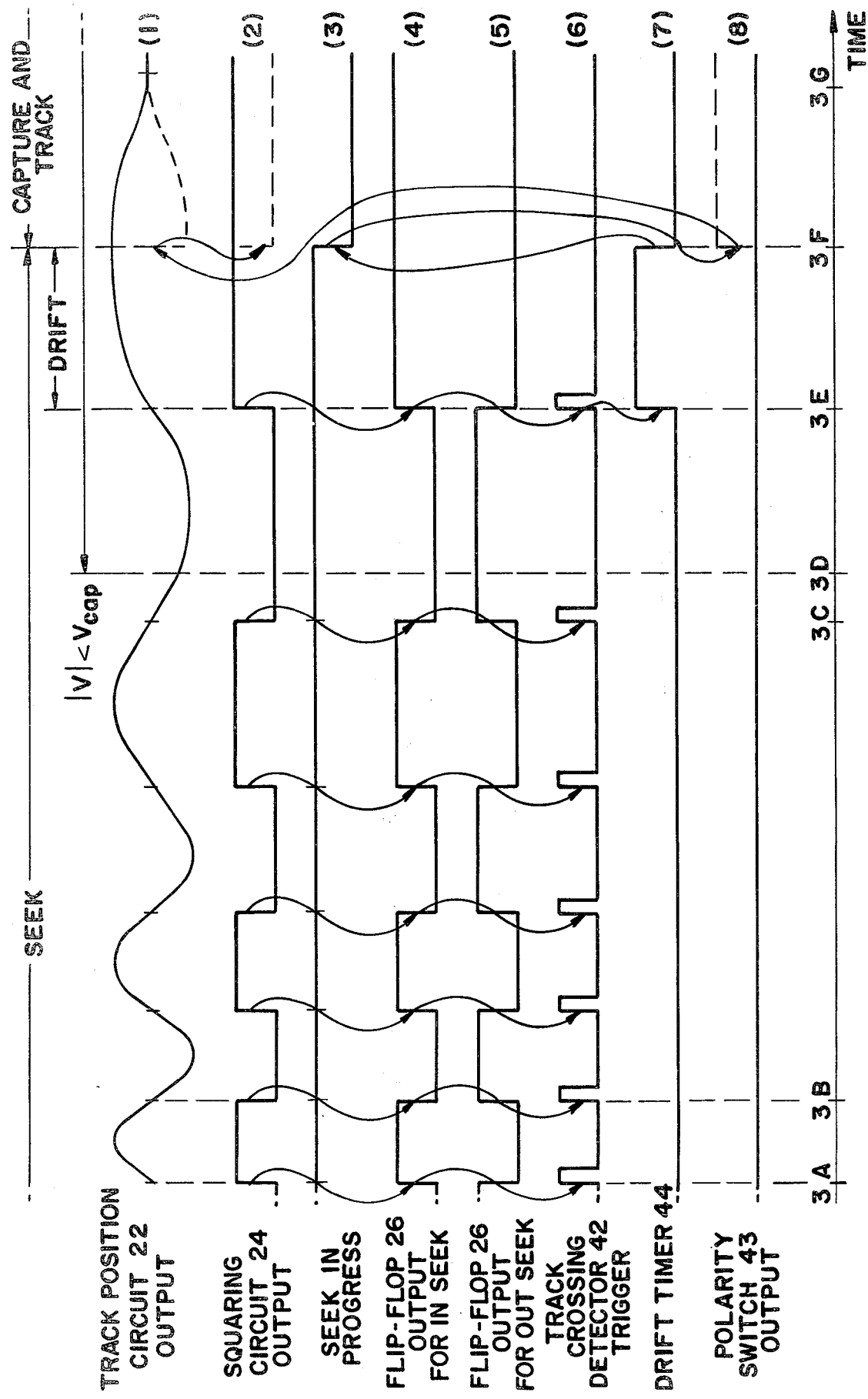

METHOD AND MEANS FOR CAPTURING MAGNETIC TRACKS

BACKGROUND OF THE INVENTION

1. Field of the Invention

The present invention relates to an apparatus and method for positioning a recording head over a data track on a rotating magnetic disc, and more specifically to an apparatus and method in a magnetic disc drive assembly for positioning a head wherein continuous head position sensing during head movement is not required to enable the head to become positioned over a new data track.

2. Description of the Prior Art

Prior art head positioning devices require the use of precision head movement tracking to enable the capture by a recording head of a desired destination track on the first attempt. To obtain such precision, it is necessary to use an accurate servo-mechanism and an expensive precision position transducer or sensor, such as a precision lead screw or a precision optical sensor, along with complex support logic circuits, to continually keep track of the head position so that the head can stop at a desired point and be accurately positioned over the desired destination track.

SUMMARY OF THE INVENTION

The present invention includes the method of enabling a movable magnetic recording head to seek and capture a desired data track on a rotating disc surface without keeping track of the position of the head during the seek, i.e. by a blind seek. An object of the invention is to make it possible to provide a low-cost disc drive for special applications, e.g. copying of blocks of data to and from a disc memory, wherein the need for shortening seek time is secondary in importance to the cost of the device. Since the track seek of the present invention is blind, there is no need for a precision head position transducer.

During the blind seek contemplated by this invention, a controller causes an actuator driver to generate an acceleration/deceleration profile which causes a rotational actuator to propel the head across the disc surface in such a manner that capture will occur at the desired data track or a nearby track. As the head crosses successive data tracks on its path toward the desired data track, it also crosses alternating odd and even head positioning tracks or track segments, each respective positioning track or track segment lying between successive data tracks. An error-detector circuit produces a sinusoidal output as the head moves across these positioning tracks.

In accordance with the invention, when the velocity of the head drops below a capture velocity ($V_{cap}$) during deceleration of the head toward the end of the seek, a drift timer is enabled at the next data track crossing detected by the head. When this timer times out, the head is at a defined distance from the target data track. A flip-flop senses and holds a positioning track signal indicative of whether the current positioning track being passed over is odd or even. Knowing the direction of the movement of the head during the seek, and with the odd or even nature of positioning track also being known, the controller and servo loop are able (by conventional techniques not material to this invention) to control the torque of the actuator to enable the accurate time-optical capture of the next data track being approached by the head. After a data track has been captured, the controller checks the identity of the data track and commands an appropriate new seek if the captured data track is not the data track desired. In practice, the correct desired track is normally captured in no more than three seeks.

BRIEF DESCRIPTION OF THE DRAWINGS

FIG. 1 is a circuit schematic, partially in block diagram form, incorporating the present invention;

FIG. 2 is a graph of the velocity of the head as it approaches the track to be captured; and FIG. 3 is a timing diagram illustrating in general the operation of the circuitry of FIG. 1.

DESCRIPTION OF THE PREFERRED EMBODIMENT

The circuit schematic of FIG. 1 illustrates a preferred embodiment of the present invention. The head positioner of FIG. 1 includes a magnetic head 12 positionable inwardly toward, or outwardly from, the center of a magnetic recording disc 14 having a plurality of generally concentric data tracks and head positioning tracks or track segments defined thereon. The head 12 is moved with respect to the disc 14, as described above, by a servo mechanism including an actuator 16 operatively enabled by torque signals generated by a servo loop 18. The actuator 16 is coupled to a tachometer 19 for producing a velocity signal representative of the head velocity. The servo loop 18 is controlled, as hereinafter explained, by a controller 20, an off-track error detector 22, and the head velocity signal generated by the tachometer 19.

The disc tracks are so organized that a head positioning track (segmented or continuous) is associated with each data track. The positioning tracks are alternately odd and even in number. As explained in my copending application Ser. No. 735,852, filed Oct. 26, 1976 and entitled METHOD AND MEANS FOR TRACKING MAGNETIC TRACKS, the position of the head with respect to the boundary between adjacent positioning tracks can be used to generate a signal whose amplitude is indicative of the amount of the head's displacement from the positioning track boundary and whose polarity is determined both by the direction of deviation and by whether the tracks near whose boundary the head is positioned are odd or even. It will be apparent from the aforesaid copending application that if the head 12 is moved across a plurality of data tracks, the output 23 of track position circuit 22 (i.e., the error signal appearing at the output 146 of the copending application) will be a sinusoidal signal whose amplitude will be maximum when the head 12 is centered on a data track and zero when the head 12 is over the boundary between two data tracks. The polarity of this sinusoidal signal at any given point in the movement of head 12 is determined by whether the data track to whose center the head 12 is closest is odd or even.

In the preferred embodiment of the invention, each data track is divided into forty-eight sectors of data. Pulses of a special format are used as sector delineators and are added between each data sector during a data recording. The head 12 detects these delineator signals as the disc rotates rapidly under the head during its radial movement across the tracks. The controller 20 receives these signals and generates therefrom a sector clock 21, which is used as described below.

When a data track is desired, a seek is performed by the controller 20 in response to an appropriate track request signal whose nature and origin is not material to this invention. This operation of the controller 20 in performing a seek is described in detail in my co-pending application Ser. No. 735,717, filed Oct. 26, 1976, entitled METHOD AND MEANS FOR SEEKING MAGNETIC TRACKS and will not be further described herein. Suffice it to say at this point that the controller 20 determines, by conventional means, the seek direction (i.e. the direction in which the head 12 must be moved to reach a desired data track) and the distance the head 12 must travel. Based on this information, the controller 20 drives actuator 16 through servo loop 18 in an appropriate acceleration-deceleration pattern. Once a seek has begun, however, there is no provision for the device of this invention to keep track of the current position of the head 12 as it moves across the tracks, i.e. the seek is blind.

The acceleration-deceleration profile chosen by the controller 20 is such that the head 12 will decelerate through the capture velocity $V_{cap}$ in the vicinity of the desired track. (If $V_{cap}$ is reached while the head 12 is between the center of the second track before the desired track and the center of the track preceding the desired track, the head will capture the desired track as hereinafter explained. Otherwise, the head will capture another track near the desired track, and a short second seek will be necessary to correct the discrepancy). Inasmuch as the exact position of the head at $V_{cap}$ is not known, and inasmuch as the output 23 of track position circuit 22, on which the capture operation is based, is affected by whether the track being captured is odd or even, it is necessary to determine, prior to initiating a capture operation, whether the track to be captured is odd or even. Were this not done, the head 12 would capture the target track in an undefined, non-time-optimal fashion or even temporarily residue at the null point of a data track with the wrong polarity for stable positioning.

The present invention enables a data track to be efficiently and quickly captured once the head 12 decelerates, as illustrated in FIG. 2, below the capture velocity $V_{cap}$, by using the signal derived from the crossing of the positioning tracks to sense whether the target track is odd or even thereby enabling the feed-back signal from track position circuit 22 to servo loop 18 to control the deceleration of head 12 so that it becomes centered over the target track in a minimum amount of time. In accordance with the invention, the sinusoidal position signal is coupled through a squaring circuit 24 to flip-flop 26, whose function is to retain a positioning track signal indicative of whether the current positioning track being passed over by the head 12 is odd or even. The flip-flop 26 is constantly updated by the sector clock 21 generated by the controller 20, as long as the system is in the seek mode. This updating is performed by an AND gate 28 which AND's a seek-in-progress signal 29 generated by the controller 20, with the sector clock 21. The seek-in-progress signal 29 is active only while the system is in a seek mode. The output of AND gate 28 is coupled to the clock input C of flip-flop 26. Thus, flip-flop 26 can only change state during a seek, so that when the system goes into the tracking mode, flip-flop 26 retains a positioning track signal indicative of whether the track over which the switchover to the tracking mode occurred is odd or even.

The state of the polarity flip-flop 26 further reflects the direction of movement of the head during a seek. During a seek, the controller 20 generates a level on the seek direction line 31 indicating either a seek in toward, or a seek out from, the center of the disc 14. This signal and its inverse are AND'ed, respectively, to the positioning track signal and its inverse via AND gates 30 and 32, as shown in FIG. 1. The signal inversions are performed by inverters 34 and 36. The outputs of gates 30 and 32 are then AND'ed together by AND gate 38. The output of this gate is coupled to the J input and, through an inverter 40, to the K input of flip-flop 26. Simply stated, this network of gates 30-40 acts to enable the flip-flop 26 to follow and retain, for a given seek direction, alternate polarity indications as a function both of the actual odd/even nature of the tracks being passed over by the head 12, and of the seek direction, with the flip-flop 26 changing state whenever the center of a data track is crossed by the head 12 during a seek.

It will be seen from the foregoing discussion and from the discussion of FIG. 3 below that the output signal 41 from flip-flop 26 at any point in the movement of the head 12 during a seek provides an indication of the whether the next track the head 12 will reach is odd or even. With this information, the polarity switch 43 (which corresponds to polarity switch 48 in my copending application Ser. No. 735,852. entitled METHOD AND MEANS FOR TRACKING MAGNETIC TRACKS) is able to polarize the track position circuit 22 in such a manner as to enable servo loop 18 to perform a time-optimal capture when the seek mode ends.

The output of squaring circuit 24 is also applied to a track crossing detector 42. The detector 42 responds to the output of squaring circuit 24 to produce a pulse whenever the flip-flop 26 changes state. The detector 42 thus provides an indication whenever the head 12 crosses the center of a data track. The output of track crossing detector 42 is supplied to one of the four inputs of AND gate 45. The other inputs of this gate are the seekin-progress signal 29; the $|V| < V_{cap}$ signal 47 produced by velocity comparator 49 whenever the head velocity sensed by tachometer 19 is below the predetermined capture velocity $V_{cap}$; and the inhibit-at-start signal 50 produced in a conventional manner by controller 20 at the start of each seek to prevent operation of drift timer 44 until the head 12 has had time to accelerate past the capture velocity $V_{cap}$.

The seek-in-progress signal 29 goes high at the start of each seek. Shortly thereafter, the inhibit-at-start signal 50 also goes high. When the head 12 decelerates through $V_{cap}$ at the end of the seek, the $|V| < V_{cap}$ signal goes high; and finally, at the next track center crossing, the output pulse of track crossing detector 42 triggers the drift timer 44.

The time-out of drift timer 44 ends the seek and initiates the capture of the next data track reached by the head 12. The interval between the triggering and the timeout of drift timer 44 is so selected that capture will be initiated when the head 12 has moved a predetermined percentage of the distance between the triggering track center crossing and the center of the track to be captured. Inasmuch as the $|V| < V_{cap}$ condition can occur anywhere between two successive output pulses of track crossing detector 42, the exact distance moved by head 12 during the drift time interval will vary from seek to seek, but in the deceleration profile of the inventive system as described in my copending application Ser. No. 737,717, entitled METHOD AND MEANS FOR SEEKING MAGNETIC TRACKS, the distance variation is small enough to be without practical significance.

When the drift timer 44 times out, it transmits an allow-capture pulse 52 to the controller 20. This pulse causes controller 20 to switch mode command line 54 from the seeking mode to the tracking mode so as to cause servo loop 18 to capture and track the next data track.

The receipt of the allow-capture pulse 52 by the controller 20 causes the controller 20 to disable the seek-in-progress signal 29. The disabling of the seek-in-progress signal 29 freezes the flip-flop 26 by preventing any further clock signals from reachng its C input through AND gate 28. The state of flip-flop 26 as timer 44 times out thus becomes the capture state, and this information is used through polarity switch 43 to inform servo loop 18 whether the head 12 is on the inward or the outward side of the center of the data track to be captured.

During a seek, the polarity of track position circuit 22 is forced into predetermined constant polarity, regardless of the output signal 41, by applying the seek-in-progress signal 29 to polarity switch 43. When the seek-in-progress signal 29 is disabled, the circuit 46 obtains the capture state from the flip-flop 26, and couples this state to the track position circuit 22.

FIG. 3 is a timing diagram illustrating the operation of the circuitry of the present invention. Illustrated is the timing of the circuit of FIG. 1 from the latter part of the seek through the capture sequence, and up to the final positioning of the head 12 over a data track. Curve (1) in FIG. 3 shows the sinusoidal output of the track position circuit 22. During the period 3A to 3G, as the head 12 continuously slows down, the period of this sinusoid gets longer, since, as described above, this output signal reflects the detection of signals from the positioning tracks being crossed by the head 12. The sinusoidal signal zero-crossing points at times 3A, 3B, etc., indicate the crossing of the centers of data tracks. When the controller 20 switches from seek to track mode at time 3F, the output signal 41 may either be such as to hold the polarity switch 43 in the polarity into which the seek-in-progress signal 29 forces it during the seek (solid line in curve (1)), or it may be such as to switch it to the reverse polarity when the seek-in-progress signal 29 goes off (dotted line in curve (1)).

The squaring circuit 24 output is shown next as curve (2), to illustrate how it is derived from the sinusoidal output of track position circuit 22. Curves (4) and (5) show that the flip-flop 26 changes state, during the seek (curve (3)), at each transition of the squaring circuit 24 output. This is an approximation, since, as mentioned previously, the sector clock pulses (48 on each data track) actually clock the state of the squaring circuit 24 output into the flip-flop 26. The sector clocks have been omitted from the timing diagram of FIG. 3 since, due to the large number occurring during a given seek, they would not be clearly depictable. This is so because the disc of the present invention typically rotates at 3,000 r.p.m. so that 144,000 sector clocks per minute are seen by the head 12. Thus, approximately as soon as the squaring circuit 24 changes state during a seek, the flip-flop 26 changes its state in response thereto. It should also be noted that the output of flip-flop 26 is only used, anyway, after the velocity of head 12 has dropped below $V_{cap}$.

The deceleration of head 12 through $V_{cap}$ is shown at time 3D. When the flip-flop 26 changes state at the next data track crossing at time 3E, the track-crossing detector 42 output pulse (curve (6)) triggers the drift timer 44 (curve (7)). The drift timer 44 times out at time 3F to end the seek mode and initiate a capture. Beyond time 3F, the flip-flop 26 cannot change state since the seek-in-progress line 29 enables the polarity switch 43 to take an output state reflecting the present state, i.e. the capture state, of flip-flop 26. The state of the polarity switch 43 affects the sign of the track position indicator's sinusoidal output signal beginning at time 3F, since this signal is used after time 3F by the servo loop 18 as a feedback signal for capturing and tracking of the next data track. Finally, at time 3G, the head 12 comes to rest over the center of the next adjacent data track following the data track sensed at time 3E.

After the head 12 has been properly positioned over the new data track, the controller 20 checks the identity of the captured data track in any well-known manner to see if it matches the track requested on the TRACK REQUEST line. If it does not, the controller 20 initiates a new seek. If, however, the controller 20 finds that the identity of the new data track matches the track requested, the controller 20 holds the servo loop 18 in the track mode to keep the head 12 centered over this data track until the next track request.

What is claimed is:

1. In a disc drive having a plurality of generally parallel data tracks which are alternately odd and even in number; a head; control means for selectively establishing a seek mode and a track mode, and for establishing a seek direction; servo means arranged to move said head in a predetermined acceleration-deceleration pattern across a plurality of data tracks during said seek mode, and to cause said head to capture and track the nearest track of appropriate odd or even nature during said track mode; and track position means arranged to produce an output of selectable polarity whose magnitude is representative of the distance of said head from the nearest track center, and whose sign is representative of the direction in which said head is displaced from said track center, of whether the track from whose center said head is displaced is odd or even, and of the selected polarity; apparatus for capturing a data track from a blind seek, comprising:

(a) means for selecting a fixed, predetermined polarity for said track position means output during said seek mode;

(b) velocity sensing and comparing means for detecting the deceleration of said head through a predetermined capture velocity;

(c) track-crossing detection means connected to detect the crossing of a data track center by said head following said deceleration through capture velocity;

(d) means for producing a first signal representative of the direction of said seek;

(e) logic means connected to said track-crossing detection means and said first signal producing means for producing, upon said crossing detection, a second signal representative both of said track position means output following said crossing and of said seek direction;

(f) means responsive to said track crossing and said deceleration through capture velocity to cause said control means to establish said track mode following the production of said second signal; and (g) switching means responsive to said second signal to select the polarity of said tracking means output, whereby said tracking means output will so match the odd or even nature of the next data track being approached by the head as to cause said servo means to perform an optimal capture of that track.

2. The apparatus of claim 1, further comprising time delay means connected to delay establishment of said track mode by a predetermined length of time after said detection of said crossing.

* * * * *